United States Patent
Kia

(10) Patent No.: US 8,486,321 B2
(45) Date of Patent: Jul. 16, 2013

(54) PRINT THROUGH REDUCTION IN LONG FIBER REINFORCED COMPOSITES BY ADDITION OF CARBON NANOTUBES

(75) Inventor: Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/191,510

(22) Filed: Jul. 27, 2011

(65) Prior Publication Data
US 2013/0029089 A1    Jan. 31, 2013

(51) Int. Cl.
    B29C 70/44    (2006.01)
    B29C 45/14    (2006.01)
    B29C 65/00    (2006.01)
    B32B 5/08     (2006.01)
    B32B 27/04    (2006.01)

(52) U.S. Cl.
    USPC ........... 264/258; 264/241; 264/257; 264/263; 156/307.1; 442/269; 442/281

(58) Field of Classification Search
    USPC ............... 264/241, 257, 258, 261, 263, 266, 264/259, 265, 271.1, 324; 156/275.5, 307.1, 156/307.3, 307.5; 442/60, 269, 281, 294; 428/299.1, 323; 977/742, 753
    See application file for complete search history.

(56) References Cited

U.S. PATENT DOCUMENTS

| | | | | |
|---|---|---|---|---|
| 5,900,311 A | * | 5/1999 | Campanella et al. | 428/215 |
| 6,331,028 B1 | * | 12/2001 | O'Neill et al. | 296/100.01 |
| 6,627,018 B1 | * | 9/2003 | O'Neill et al. | 156/78 |
| 6,863,973 B2 | * | 3/2005 | Tomokuni et al. | 428/323 |
| 7,022,629 B2 | * | 4/2006 | Theriault | 442/349 |
| 7,056,567 B2 | * | 6/2006 | O'Neill et al. | 428/71 |
| 7,112,372 B2 | * | 9/2006 | Blair et al. | 428/626 |
| 2001/0006131 A1 | * | 7/2001 | Bream | 181/167 |
| 2003/0119398 A1 | * | 6/2003 | Bogdanovich et al. | 442/204 |
| 2007/0230196 A1 | * | 10/2007 | Wang et al. | 362/417 |
| 2008/0088058 A1 | * | 4/2008 | Iobst et al. | 264/257 |
| 2009/0266477 A1 | * | 10/2009 | Weisenberger | 156/185 |
| 2010/0078194 A1 | * | 4/2010 | Bhatt et al. | 174/110 SR |
| 2011/0049292 A1 | * | 3/2011 | Kruckenberg et al. | 244/1 A |

OTHER PUBLICATIONS

Shi et al. (Magnetic alignment of carbon nanofibers in polymer composites and anisotropy of mechanical properties. J. Appl. Phy. 97, 064312 (2005)).*

Garmestani et al. (Polymer-Mediated Alignment of Carbon Nanotubes under High Magnetic Fields. Adv. Mater. 2003, 15, No. 22, Nov. 17).*

Lin et al. (Discussion on the Cause of Print-through Phenomenon of FRP and Several Improvement Methods. Journal of Composite Materials. vol. 44, No. 17, pp. 2111-2126).*

* cited by examiner

Primary Examiner — Christina Johnson
Assistant Examiner — Atul P. Khare
(74) Attorney, Agent, or Firm — Reising Ethington P.C.

(57) ABSTRACT

Polymer articles are often reinforced by addition of fibers which may be assembled into a structured reinforcement such as a woven mat or sheet and the mat or sheet serves as the reinforcement. Such woven fiber-reinforced polymer composite articles may exhibit undesirable variations in surface height which mimic the geometry of the underlying reinforcements, a phenomenon known as print through. By forming, on the surface of the article, a relatively thin, layer of a compatible polymer incorporating closely-spaced, short, carbon nanotubes more or less uniformly dispersed throughout the layer and oriented normal to the article surface, print through may be reduced or eliminated. Methods for fabricating such an article are detailed.

8 Claims, 3 Drawing Sheets

PRINT THROUGH REDUCTION IN LONG FIBER REINFORCED COMPOSITES BY ADDITION OF CARBON NANOTUBES

TECHNICAL FIELD

This invention pertains to methods for reducing print through, or surface irregularities generally corresponding to the scale of the fiber weave, in molded polymer composite structures with woven long fiber reinforcements.

BACKGROUND OF THE INVENTION

It is well known that the strength and stiffness of a material may be improved by addition of strong and/or stiff reinforcements such as particles, chopped fibers or long fibers to form a composite structure. This practice is applicable to many matrix materials including metals, ceramics and polymers, but is frequently employed with polymer matrices, which offer lesser strength and stiffness, but lower density, than either ceramics or metals. Thus such a reinforced polymer structure may offer good strength and stiffness in combination with low mass.

If low mass is of particular concern, the composite mass may be further minimized by using a higher strength and low density fiber reinforcement in addition to a low density polymer matrix. Minimizing the mass of the composite will increasingly depend on minimizing the mass of the reinforcing higher strength fibers as performance demands accelerate the trend toward increasing fiber volume fractions. One, commonly used, high strength, low density reinforcement is carbon fibers.

In some applications, consideration of only a limited number of engineering attributes, like stiffness, strength or mass of a reinforced polymer may be sufficient to determine whether or not it is suited for a particular purpose. In many more applications however, a much broader range of engineering properties, characteristics and behaviors must be taken into account. For example, in assemblies where multiple materials are employed, compatibility, in performance or appearance, with other, different materials may be an issue. A case in point occurs in some automotive applications, where an individual reinforced composite component or structure, for example a hood, may be located adjacent to a sheet metal component, for example a fender. It is intended that the painted appearance of all the components should match.

Reinforcing fibers may be used as discrete reinforcements but in many cases, the carbon fibers are arranged in organized groupings. For example, in some carbon fiber reinforced polymers the generally cylindrical carbon fibers are first organized into tows. These are assemblages of continuous or near-continuous, untwisted fibers loosely gathered together. Tows often adopt a ribbon-like configuration and may be generally elliptical in cross-section, and are, optionally, lightly secured using an epoxy sizing. Such tows may then be woven into any desired 2-dimensional pattern to form a reinforcing fabric or sheet. While individual fibers may have a diameter of at least a micrometer or so, a more typical dimension is between 10 and 20 micrometers. A tow, by contrast, which may contain from about 1 to 50 thousand fibers may range in width from between 1.0 to 10 millimeters, or, equivalently, of between 1000 and 10,000 micrometers. Typical weave patterns may be somewhat coarse with adjacent parallel tows being spaced between 1 and 5 millimeters apart.

Fabrication of a component begins with impregnating the woven sheets with a polymer resin, which, for ease of handling, is often partially cured or B-staged but remains flexible and conformable. Such a resin-impregnated sheet is termed a prepreg.

In volume production, heated multipart molds are frequently employed. Such molds are capable of receiving the prepreg and shaping it, under pressure, to the desired article shape before the mold is heated. The mold temperature may then be increased to raise the prepreg temperature and cure the resin and form a composite article. The mold parts are separable for loading the prepreg and for extracting the cured article and the various mold parts, when assembled into their operating configuration, define a die cavity corresponding to the desired article geometry.

Such mold may accept a single prepreg but, more frequently, multiple resin-impregnated sheets are placed one atop the other to form a layup. In assembling the layup, the sheets, and their associated reinforcements, may be displaced or rotated with respect to one another to reduce in-plane property directionality in the finished component. The layup may be fabricated in the mold or may be prepared off-line and placed in the mold only when fully assembled.

The coefficients of thermal expansion (CTE) of the polymer and reinforcement are significantly different. In addition, most carbon fibers have an anisotropic CTE, exhibiting one CTE along their axis and a second CTE across their diameter, assuring that there will be at least some mismatch in CTE between the fiber and the larger and more isotropic CTE of the polymer. During cool-down of the composite article this mismatch in CTE will induce stresses which will produce print through of the weave pattern, that is, surface distortions which mimic the weave pattern spacing. The regions between the fiber tows will be depressed compared to the more elevated regions overlying the fiber tows.

These surface distortions, or print through of the fiber pattern, are clearly visible, particularly on a painted surface, and are unacceptable on any 'show surface' which may be viewed by a customer. Thus many viewable fiber composite components require extensive finishing, typically priming and sanding, prior to final painting.

There is therefore a need for a method of suppressing or minimizing print through in fiber reinforced composite panels to minimize the need for remedial surface treatments prior to assembly and painting of the panels.

SUMMARY OF THE INVENTION

This invention provides a method for minimizing print through distortions in surfaces of woven fiber reinforced polymer composite articles. The invention is practiced so as to provide higher quality visible surface layers on polymer composite articles that otherwise benefit from the presence of extensive woven fiber reinforcement layers.

In accordance with embodiments of the invention, a preformed, moldable, polymer prepreg layer, reinforced with closely spaced, vertically oriented, carbon nanotubes is applied to an intended visible surface of the woven fiber-reinforced layup material. The woven fiber reinforced material makes up the body portion of the molded composite article, but the nanotube layer is sized and shaped to form one or more surfaces of the composite article. In contrast with the orientation of the woven fibers in the underlying polymer body layer(s), the carbon nanotubes are oriented transverse to the thickness of the comparatively thin applied covering polymer layer for the surface of the molded composite article. The woven fiber reinforced polymer portion and each covering polymer layer of oriented carbon nanotubes are shaped together and their polymer content cured together to form a durable composite article with smoother visible surfaces. The transverse orientation of the carbon nanotubes in the covering polymer layer reduces uneven shrinkage of surface regions and leaves a relatively smooth surface on the article that is mainly strengthened with the woven fibers. By addition of such a covering layer, the upper surface of the article is made more homogeneous, reducing the disparity in CTE and other properties between open and filled regions of the weave, which would otherwise lead to the observed print through.

Carbon nanotubes are hollow co-axial cylinders of carbon whose diameters are measured in nanometers or tens of nanometers, with lengths which may extend over tens of millimeters. They exhibit high strength and a low coefficient of thermal expansion (CTE) along their cylinder axis. Hence the thermal contraction of a vertically arranged carbon nanotube polymer composite will be greatly reduced compared to the thermal contraction of the polymer alone, further reducing the tendency for print through in the composite article.

Carbon nanotubes are commonly grown by a catalyzed gas-phase reaction. A substrate is prepared with a layer of metal catalyst particles of a predetermined size related to the desired nanotube diameter. Typically these particles contain nickel, cobalt, molybdenum, and iron, singly or in combination. The substrate is heated to approximately 750° C. in an atmosphere of an inert gas, for example ammonia, nitrogen or hydrogen and then exposed to a carbon-containing gas, such as acetylene, ethylene, ethanol or methane or a mixture of CO and hydrogen. Nanotubes grow at the sites of the metal catalyst, where it appears that the carbon-containing gas decomposes at the surface of the catalyst particle, liberating carbon which is absorbed by the catalyst particle and transported to the particle edges, where it forms the nanotubes.

An exemplary procedure for forming vertically-aligned carbon nanotube arrays is to fabricate, on a silicon wafer substrate with a 10 nanometer or so thick layer of $Al_2O_3$, a plurality of densely-packed iron catalyst particles, each ranging in size from about 10 to 20 nanometers. A suitable procedure is to deposit, from aqueous solution, an iron salt, which, when on evaporation of the water and exposure to suitably elevated temperatures under an inert gas atmosphere will decompose to form the iron catalyst particles. By flowing ethylene, at elevated temperature, over the silicon wafer-supported iron particles, carbon nanotubes may be formed. Under the following process conditions: a process temperature of 800° C.; a process temperature of 800° C.; an ethylene flow rate of about 1 mm/second linear velocity; and, a chamber pressure of about 1 atmosphere; carbon nanotubes of 3 to 5 millimeters in length and about 10 nanometers in diameter may be obtained in 2 to 4 hours. The nanotubes are present at a surface density of about $10^{11}$ fibers/$cm^2$ and substantially uniformly distributed and commonly oriented with their long or cylindrical axis generally perpendicular to the surface of the supporting silicon wafer.

A surface density of $10^{11}$/$cm^2$ corresponds to uniformly spaced nanotubes about 30 nanometers apart. The desired nanotube density may be adjusted either by controlling the density of nuclei or, if greater densities are required, by compressing the nanotube array to any appropriate extent.

The nanotube array may be impregnated with polymer resin which should be selected to be compatible with the pre-preg resin. One exemplary resin is a bisphenol A-based epoxy resin, which may then be partially cured or B-staged so that the resin and cross-linking agent have reacted only to the extent of producing a viscoelastic solid. The B-staged resin/nanotube composite may be used as-prepared, or sliced, using a microtome or other devices, in a direction parallel to the surface of the silicon wafer support, to form composite layers of any desired thickness. By slicing the layers in this way the cylindrical axes of the cut-off nanotube segments are maintained generally perpendicular to the surfaces of the layer.

These B-staged resin/nanotube composite layers may then be placed as a surface layer on the stack of pre-pregs which make up the layup. Usually it will be necessary to apply the nanotube composite layer to only one surface of the layup, but in cases, where both sides of an article are visible, it may be appropriate to apply the nanotube composite layer to both surfaces.

Application of pressure to the layup, now including the nanotube-resin composite layer, will fuse the nanotube composite layer with the reinforcing fabric layers and drive the nanotubes into the surface while substantially maintaining their orientation generally normal to the article surface. Application of heat to cure the composite will permanently embed the oriented nanotubes into the article surface and establish a strong bond between the polymer and nanotube.

Now, the tendency for the polymer-rich regions of the component to shrink in the thickness direction of the article during cool-down from the cure temperature will be opposed by the low CTE and high strength of the nanotubes. Also, the surface composition will be homogeneous on a scale of down to tens of nanometers so that any inhomogeneity in shrinkage will be less visible.

The effectiveness of nanotube-polymer layer in controlling the distortion of the polymer will depend on the relative strengths of the nanotube-polymer composite and the polymer alone. It will also depend on the relative thicknesses of the nanotube-polymer layer and the polymer layer, generally equal to about 1.5 times the thickness of the tow after molding.

These and other aspects of the invention are described below, while still others will be readily apparent to those skilled in the art based on the descriptions provided in this specification.

BRIEF DESCRIPTION OF THE DRAWINGS

In FIG. 1A the composite is at its elevated cure temperature and the composite surface is generally flat. In FIG. 1B, the composite has cooled from its curing temperature and the composite surface displays a regular arrangement of dips and rises which is related to the arrangement of the fibers in the mat reinforcement.

DESCRIPTION OF PREFERRED EMBODIMENTS

The following description of the embodiment(s) is merely exemplary in nature and is not intended to limit the invention, its application, or uses.

Carbon fibers ranging in diameter from about 1 micrometer to about 20 micrometers in diameter are popular reinforcements for high performance fiber reinforced polymer composites. Such fibers may be employed individually but, more commonly a number of such fibers will be gathered together to form a tow with a lateral dimension of between 500 micrometers to 1000 micrometers. A plurality of such tows may be arranged as warp and weft and woven together into a woven reinforcing mat. Such a mat may be impregnated with polymer resin or a B-staged polymer resin to form a prepreg and then assembled, with other prepregs, to form a layup. The layup may be shaped into a desired form, by application of pressure in a die, and cured, in the die, by application of heat to produce the desired carbon fiber reinforced polymer composite article.

But, conventional carbon fiber reinforced polymer composites often exhibit visible surface features which mimic the subsurface distribution of the fibers in the composite. These visible surface features, known as print through, are most visible when the fibers are placed in an organized or patterned fashion, such as the just-described woven mat.

Figure 1A:
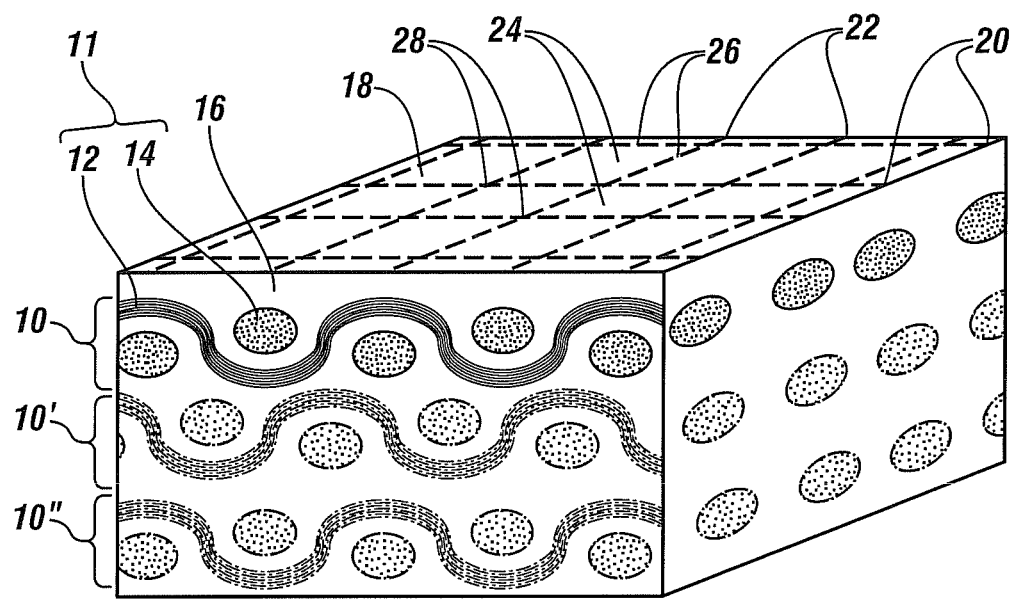
FIGS. 1A and 1B show a schematic view of a section of a woven fiber reinforced composite and a perspective view of the surface of the composite.

Print through predominantly arises due to the difference in coefficient of thermal expansion (CTE) of the polymer and the carbon fiber reinforcement. FIG. 1A depicts a sectional view of a layer of prepreg 10 incorporating a woven reinforcement 11 and a thermosetting polymer resin 16. Woven reinforcement 11 consists of a warp 12 and weft 14 which pass over and under one another in alternating fashion. Typically each of the warp 12 and weft 14 will consist of tows, each containing a plurality of individual fibers. It is intended that these prepreg layers, and possibly additional underlying layers 10', 10" (shown in gho st), will be assembled into a layup. The uppermost layer, layer 10, will be positioned adjacent to a face of the mold cavity so that its surface 18 will form the surface of the composite article. As is common when fabricating a layup of several prepreg layers the carbon fiber weave of each of layers 10, 10' and 10" has been slightly misaligned relative to its neighboring layer for better uniformity of in-plane properties in the finished article. The details of the weave and the misalignment are intended only to be illustrative, and should not be construed as either limiting or representative.

For clarity, the traces of warp 12 and weft 14 of surface layer 10 have been mapped onto surface 18 as dotted lines 20 and 22. Three regions may be distinguished. In regions 24 which lies between the warp 12 (20) and the weft 14 (22) of the weave there is no reinforcing fiber so that at this location the prepreg is substantially resin. In regions 26 which overlie either of the warp 12 (20) or the weft 14 (22), the prepreg will consist of reinforcing fiber and resin in comparable proportions. At locations 28 the warp 12 (20) and weft 14 (22) overlie one another so that the prepreg at this location will predominantly consist of reinforcing fiber with minimal resin.

During cool-down after elevated temperature curing, the composite part will contract unequally in these different locations 24, 26, 28 due to the different proportions of resin and reinforcing fiber. A typical coefficient of thermal expansion of an epoxy, representative of many potential matrix materials, ranges from about $60\text{-}100 \times 10^{-6}/°C$. Graphite fibers show a negative thermal expansion coefficient of about $-1.4 \times 10^{-6}/°C$. along their fiber axis and a thermal expansion coefficient of about $2.1 \times 10^{-6}/°C$. in a direction transverse to the fiber axis. There will therefore be a significant difference in the extent of thermal expansion of a volume containing both fibers and polymer depending on the proportions of polymer and fiber. Locations which contain higher proportions of polymer will exhibit a much greater contraction on cooling.

Figure 1B:
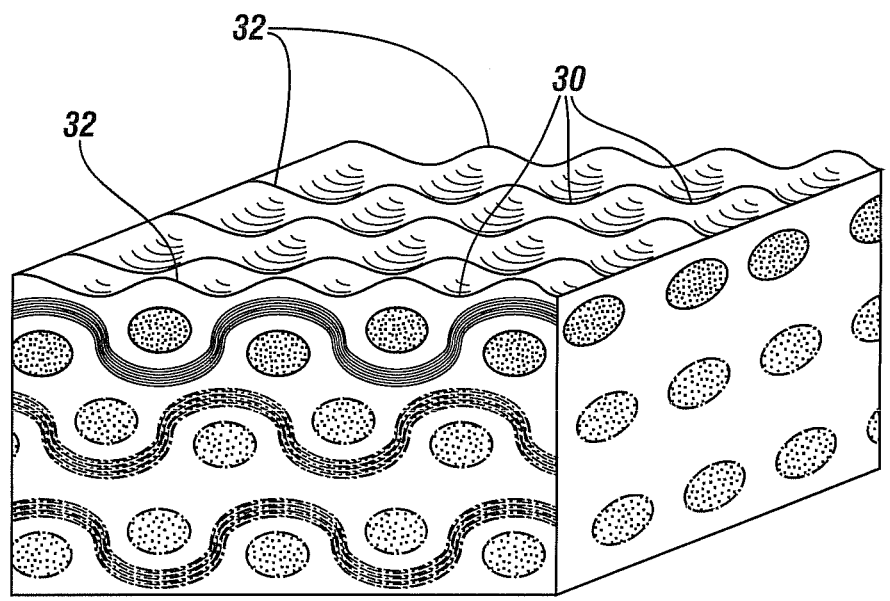

The disparity in CTE and the wide variation in fiber/polymer contents occurring at locations 24, 26 and 28 results in major difference in the elevations of the article surface in these locations. Of course, these locations 24, 26, and 28 repeat with the periodicity of the weave so that the variation in surface elevation will vary, in a regular and systematic manner across the entire surface 18 and will have a periodicity which reflects and mimics the periodicity of the weave. This phenomenon is known as print through, and is illustrated in FIG. 1B which shows an undulating periodic two-dimensional pattern of alternating peaks 32 and valleys 30.

Print through therefore results from the differing proportions of polymer resin in different locations in the surface layer and the large difference(s) in CTE between the polymer and the reinforcing fiber. Both issues may be addressed by placing, as the uppermost layer of the layup, and hence on the article surface, a layer of more homogeneous composition which exhibits a lesser CTE.

Figure 2:
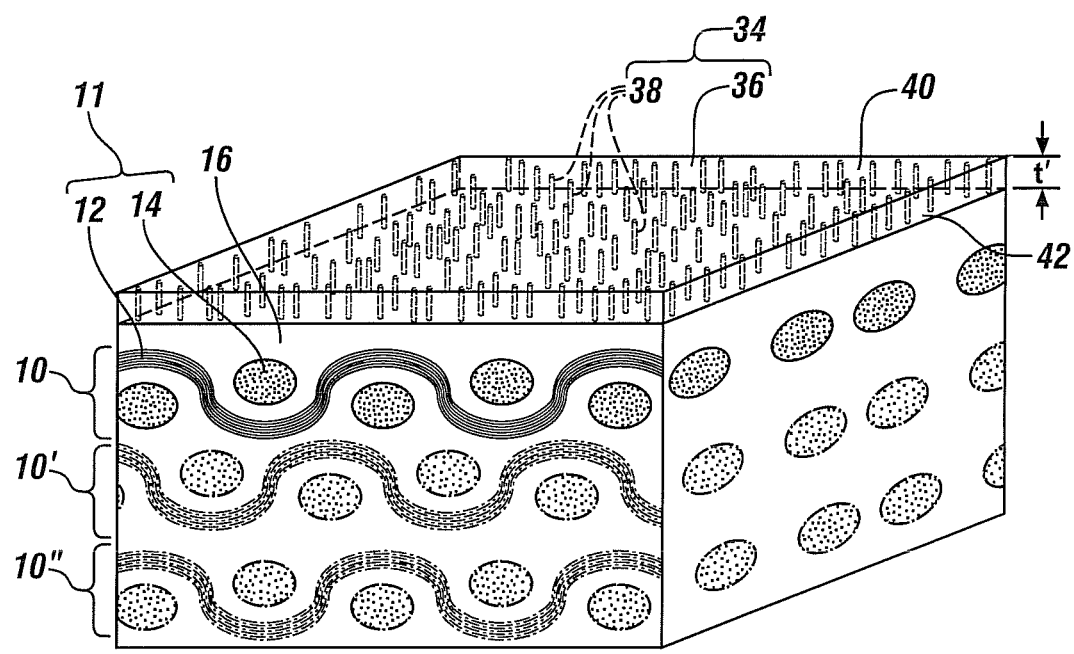
FIG. 2 shows a schematic view of a section of a woven fiber reinforced composite and a perspective view of the surface of the composite after addition of a nanocomposite resin layer incorporating, in a resin matrix, carbon nanotubes. The carbon nanotubes extend through the thickness of the nanocomposite resin layer and are oriented generally normal to the surface of the nanocomposite resin layer.

Such a layer is schematically illustrated in FIG. 2. The layup now contains at least two layers, the original woven carbon fiber layer 10 (and optionally 10' and 10") and a second layer 34 consisting of a compatible, B-staged resin 36 and a plurality of carbon nanotube reinforcements 38 extending through the layer thickness t' and oriented generally normal to the layer surfaces 40, 42.

Carbon nanotubes are hollow co-axial cylinders of carbon whose diameters are measured in nanometers with lengths which may extend over tens of millimeters and exhibit high strength and a low coefficient of thermal expansion (CTE) along their cylinder axis. When the spacing of the nanotubes is small relative to the wavelength of visible light, layer 34 will appear as a homogenous layer. Also the high strength and low CTE of the carbon nanotubes will reduce the CTE of the nanotube reinforced polymer relative to the polymer alone. This greater homogeneity of the surface layer and its reduced CTE will cooperate to minimize the spatial variations in contraction exhibited by any of the woven fiber reinforced layers. In turn, this will thereby reduce the tendency for print through in the composite article. These benefits require that layer 34 be bonded to layer 10 so that it may be integrated into the prepreg. It is therefore important that the resin of layer 34 be at least compatible with, and preferably, identical to, the resin of layer 10. It is also important that layers 10 and 34 be brought into intimate contact over their entire area. This may be accomplished by assuring that the prepreg thickness is modestly greater than the mold cavity thickness to ensure that die closure will enforce the desired relationship between layers.

Figure 3A:
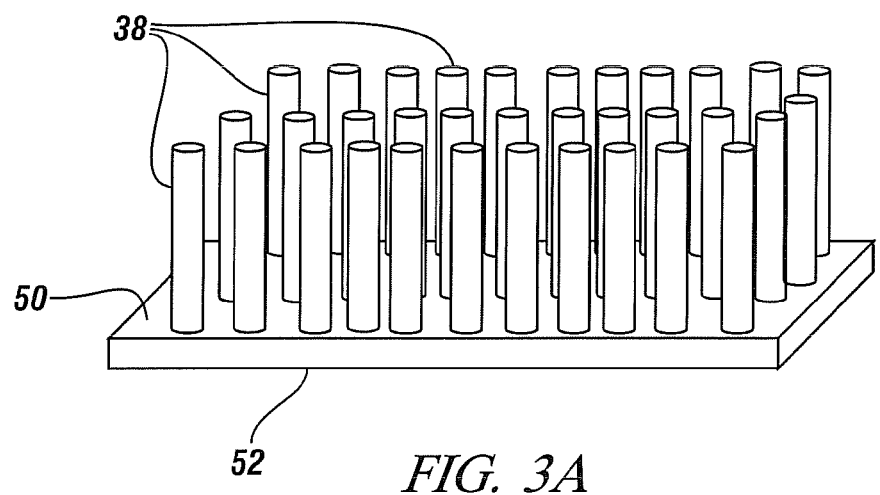
FIGS. 3A-3C show a schematic illustration for a sequence of steps required for fabrication of a vertically aligned carbon nanotube/polymer layer including: growing the nanotubes of a desired length on a substrate; infiltrating the substrate with a resin to form a resin/nanotube composite; and separating the resin/nanotube composite from the substrate to form a resin/nanotube layer.

One approach to forming a carbon nanotube reinforced resin or B-staged resin layer is illustrated in the steps shown in FIGS. 3 A-C. Catalyst particles may be formed or laid down on a suitable substrate. The particles may be laid down as a thin layer of metal salt deposited from solution for example a nitrate, and then reduced to form small metal droplets on the surface. Or a metal powder may be sprinkled on the substrate. Alternatively, the salt reduction process may be performed using a thin frangible layer, of say, aluminum oxide as a support. After forming the catalyst particles the particle-support combination may be crushed to form small particles with yet smaller associated metal catalysts. The crushed, catalyst-containing particles may then be laid down on the substrate. The substrate and catalyst particles are first conditioned by high temperature exposure to a process gas, for example, ammonia, nitrogen or hydrogen. After conditioning, particles are exposed to a slowly-flowing (about 1 mm/second) carbon-containing gas such as acetylene, ethylene, ethanol or methane at a temperature of approximately 750° C. and held at temperature for a period of several hours. This procedure results in the formation of nanotubes of predictable lengths and diameters whose diameters may measure in tens of nanometers with lengths of about a few millimeters. The nanotubes 38, as illustrated in FIG. 3A, will be generally parallel to one another and oriented generally normal to surface 50 of substrate 52.

Figure 3B:
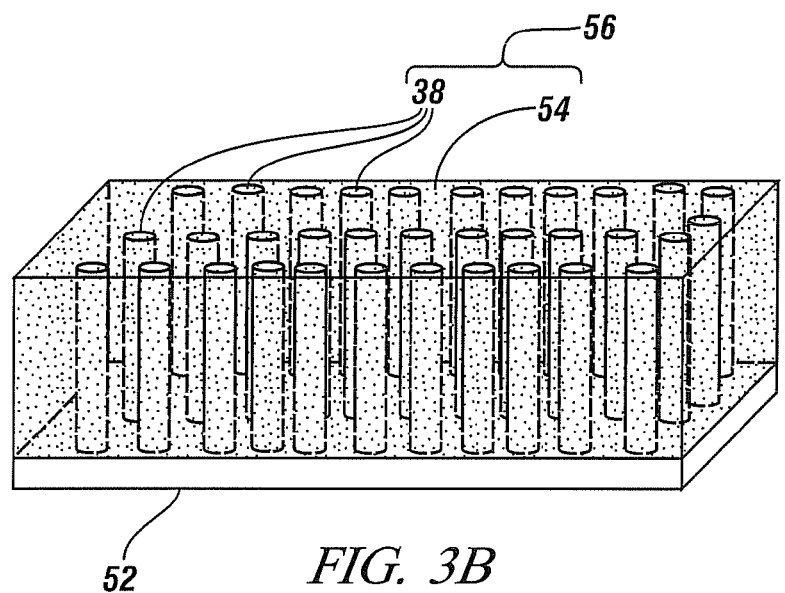
Figure 3C:
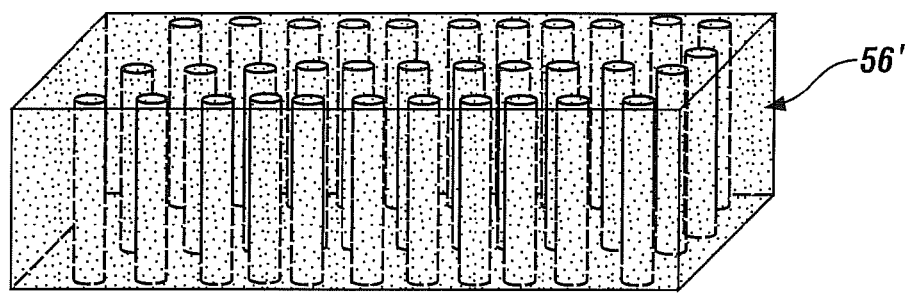

In FIG. 1B the carbon nanotubes 38 of FIG. 3A, still associated with substrate 52 are infiltrated, with a flowable polymer resin such as an epoxy containing sufficient hardener to enable B-stage polymerization 54 and render a substantially filled composite carbon nanotube-resin block 56 attached to substrate 52 as shown in FIG. 3B. After polymerization has proceeded sufficiently to develop the desired B-staged resin, it may be removed from the substrate as a layer 56' of carbon nanotube-resin composite with the nanotubes oriented generally normal to the substrate surface as shown in FIG. 3C. In an alternative approach, layers of any suitable thickness may be removed from block 56 (FIG. 3B) using a microtome, or other suitable cutting device.

Figure 4:
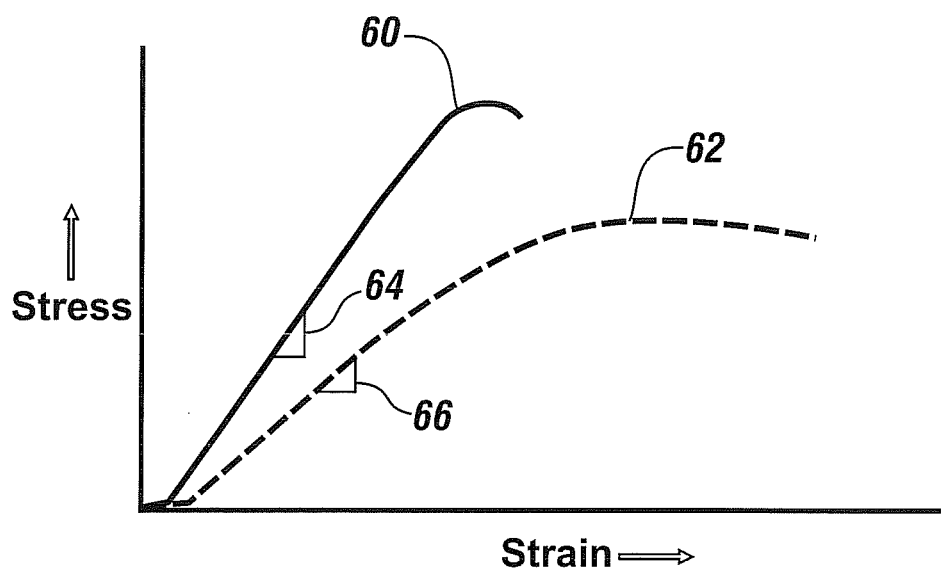
FIG. 4 shows the schematic stress-strain behavior of a representative polymer matrix and compares it with the stress-strain behavior of an oriented nanotube reinforced polymer.

In common with other composite materials, the strength and stiffness of a nanotube-polymer composite, that is the strength and stiffness of layer 56' when fully cured, is greater than that of the polymer alone. This is shown in FIG. 4 which schematically compares the stress strain behavior of the nanotube composite, curve 60 with that of the polymer alone, curve 62. The initial slope of the respective curves, is greater for the composite 64 than for the polymer 66 and the strength of nanotube is greater than the strength of the polymer The addition and incorporation of carbon nanotube-reinforced layer 34 to the prepreg incorporating at least woven reinforcement layer 10 (FIG. 1A) imparts at least three attributes to the prepreg which cooperatively reduce print through. The scale of the inhomogeneity of the surface layer is dramatically reduced from the tow spacing of between 1 and 5 millimeters to the nanotube spacing of 300 nanometers or less; the low CTE of the nanotubes in combination with their close spacing acts to reduce the CTE of the nanotube-resin composite, narrowing the difference in CTE between the carbon fibers of the tow and the unreinforced resin; and the greater strength and stiffness of the nanotube polymer composite, shown in FIG. 4, will resist the greater thermal contraction of the polymer.

To be effective the nanotube layer must be sufficiently strong to resist the stresses generated in the underlying layers. The relative strengths of the layers will generally depend on the product of the intrinsic strength of the layer and the layer thickness. So the nanotube-polymer composite layer, to exert appreciable influence on underlying carbon fiber mat reinforced polymer layer, should be of comparable thickness. The influence of the nanotube-polymer layer will increase with increasing thickness of the layer but further improvement in surface quality is minimal with nanotube-polymer layer thicknesses greater than about 1.5 times the thickness of the underlying woven carbon fiber mat reinforced polymer layer. In turn, the thickness of the fiber mat reinforced polymer layer will generally equal twice the thickness of the tow since its thickest location will be where the warp and weft cross over one another, location 34 in FIG. 1. So it is preferred that the nanotube-polymer layer be between twice and three times the tow thickness after molding.

Print through is not restricted to only woven carbon fiber reinforcements in polymers. Any woven fiber reinforcement in which the fiber CTE differs substantially from that of the polymer matrix may also exhibit the phenomenon. For example glass has a CTE which ranges from about $4\text{-}9\times10^{-6}/°$ C. This is again very different from the $60\text{-}100\times10^{-6}/°$ C. of an epoxy and so may also lead to issues of print through. The practices of the invention are similarly applicable to woven glass fiber reinforced polymers, fabricated, for example, of E-glass or S-glass and any other woven reinforcement in addition to woven carbon fiber reinforcements.

The practice of the invention has been illustrated through reference to certain preferred embodiments that are intended to be exemplary and not limiting. The full scope of the invention is to be defined and limited only by the following claims.

The invention claimed is:

1. A method of making a unitary polymer article comprising a polymeric body reinforced with one or more woven fiber layers and a polymeric covering layer comprising aligned carbon nanotubes, the covering layer being co-extensive with and bonded to an intended visible surface of the polymeric body for providing visual surface smoothness thereto, the method comprising:

forming a prepreg layer by infiltrating a woven fiber layer with a liquid precursor composition of a thermosetting polymer and then B-staging or partially curing the liquid precursor composition, the woven fiber layer comprising fiber tows generally evenly spaced by between 1-5 millimeters;

forming a prepreg layup by assembling one or more prepreg layers, the layup having an intended visible surface;

placing a covering layer on the intended outer visible surface of the prepreg layup, the covering layer having opposing surfaces and comprising an array of aligned carbon nanotubes generally uniformly spaced by between 30-300 nanometers, the covering layer being formed by infiltrating the array of carbon nanotubes with a thermosetting polymer composition compatible with that of the prepreg and then B-staging or partially curing the thermosetting polymer composition to a curable state, the carbon nanotubes extending from opposing surface to opposing surface of the covering layer, the carbon nanotubes in the placed covering layer standing upright and substantially perpendicular to the intended visible surface of the prepreg layup and its one or more woven fiber layers, and the covering layer lying in face-to face contact with and coextensive with the intended visible surface of the prepreg layup;

molding and consolidating the placed covering layer and prepreg layup to an intended shape and thickness of the polymer article while ensuring intimate contact between the facing layers and then curing the two thermosetting polymer compositions to form the unitary polymer article having a permanently bonded polymeric covering layer and polymeric body; and cooling the resulting unitary polymer article comprising the polymeric body and the nanotube-containing polymeric covering layer, the nanotube-containing covering layer providing smoothness to the intended visible surface of the article.

2. The method recited in claim 1 in which the fiber of the reinforcing woven fiber layer is carbon fiber.

3. The method recited in claim 2 in which the reinforcing woven carbon fiber layer comprises a tow with a thickness and the thickness of the polymeric covering layer ranges from 2 to 3 times the thickness of the tow after molding.

4. The method recited in claim 2 in which the two thermosetting polymer compositions are substantially identical.

5. The method recited in claim 4 in which the two thermosetting polymer compositions are bisphenol-A based.

6. The method recited in claim 1, further comprising forming said infiltrated array with carbon nanotubes of suitable length by growing an array of substantially parallel carbon nanotubes of a determined length on a surface of a substrate and oriented normal to the substrate surface, infiltrating the nanotubes on the substrate, and then slicing the infiltrated array in a direction parallel to the substrate surface to form carbon nanotubes of a length less than the determined length.

7. The method recited in claim 1 in which the tows comprise between 1,000 and 50,000 carbon fibers of generally cylindrical cross-section and ranging in diameter from about 1 to 20 micrometers.

8. A method of making a unitary polymer article comprising a polymeric body reinforced with one or more woven fiber layers and a polymeric covering layer comprising aligned carbon nanotubes, the covering layer being co-extensive with and bonded to an intended visible surface of the polymeric body for providing visual surface smoothness thereto, the method comprising:

forming a prepreg layer by infiltrating a woven carbon fiber layer with a liquid precursor composition of a thermosetting polymer based on bisphenol-A and then B-staging or partially curing the liquid precursor composition, the woven fiber layer comprising fiber tows generally evenly spaced by between 1-5 millimeters, and the tows comprising between 1,000 and 50,000 carbon fibers of generally cylindrical cross-section and ranging in diameter from about 1 to 20 micrometers;

forming a prepreg layup by assembling one or more prepreg layers, the layup having an intended visible surface;

placing a covering layer on the intended outer visible surface of the prepreg layup, the covering layer having opposing surfaces and comprising an array of aligned carbon nanotubes generally uniformly spaced by between 30-300 nanometers, the covering layer being formed by infiltrating the array of carbon nanotubes with a thermosetting polymer composition based on bisphenol-A and then B-staging or partially curing the thermosetting polymer composition to a curable state, the carbon nanotubes extending from opposing surface to opposing surface of the covering layer, the carbon nanotubes in the placed covering layer standing upright and substantially perpendicular to the intended visible surface of the prepreg layup and its one or more woven fiber layers, and the covering layer lying in face-to-face contact with and coextensive with the intended visible surface of the prepreg layup;

molding and consolidating the placed covering layer and prepreg layup to an intended shape and thickness of the polymer article while ensuring intimate contact between the facing layers and then curing the two thermosetting polymer compositions to form the unitary polymer article having a permanently bonded polymeric covering layer and polymeric body; and cooling the resulting unitary polymer article comprising the polymeric body and the nanotube-containing polymeric covering layer, the nanotube-containing covering layer providing smoothness to the intended visible surface of the article.

* * * * *